United States Patent [19]

Seo et al.

[11] Patent Number: 4,872,153
[45] Date of Patent: Oct. 3, 1989

[54] DETECTING LIGHT SPOT MOVEMENT DIRECTION FOR AN OPTICAL DISK

[75] Inventors: Hiromi Seo, Odawara; Osami Kushizaki, Hiratsuka, both of Japan

[73] Assignee: Hitachi, Ltd., Tokyo, Japan

[21] Appl. No.: 179,389

[22] Filed: Apr. 8, 1988

[30] Foreign Application Priority Data

Apr. 10, 1987 [JP] Japan .................................. 62-87140

[51] Int. Cl.⁴ .............................................. G11B 7/00
[52] U.S. Cl. ......................................... 369/44; 369/46
[58] Field of Search .................................. 369/43–47; 250/201; 358/342

[56] References Cited

U.S. PATENT DOCUMENTS 4,338,682 7/1982 Hosaka et al. ......................... 369/44
4,506,149 3/1985 Utsumi ............................. 369/44 X

FOREIGN PATENT DOCUMENTS 58-91536 5/1983 Japan .

OTHER PUBLICATIONS

Japanese Patent Abstract 58-91536, (English Translation) May 31, 1983.

Primary Examiner—Robert L. Richardson
Attorney, Agent, or Firm—Fay, Sharpe, Beall, Fagan, Minnich & McKee

[57] ABSTRACT

The peak value of upper envelope of an optical disk read signal is detected, and a signal indicative of the detected peak value or upper envelope is used to correct the total reflected light amount signal. That is to say, two output signals delivered from a pair of horizontally symmetrical photo detectors, which detect the reflected light of a light spot, added together, and furthermore a signal indicative of the result of this addition is added to the signal indicative of the peak value or upper envelope to produce a total reflected light amount signal which is not influenced by the pits on the optical disk.

8 Claims, 4 Drawing Sheets

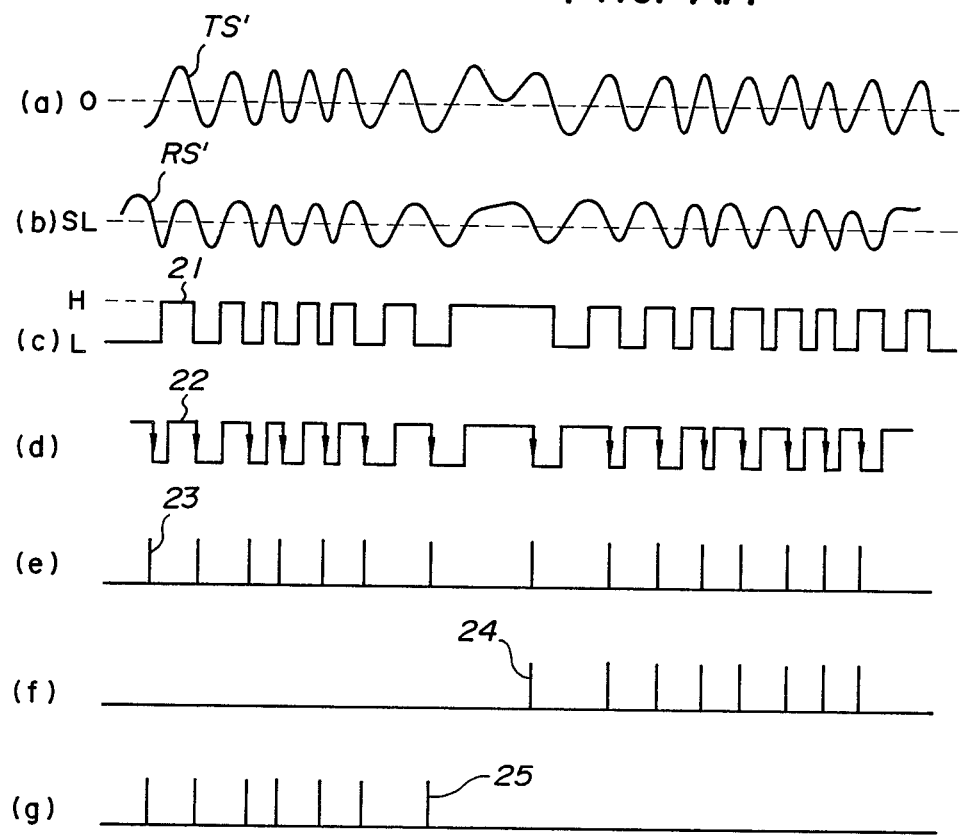

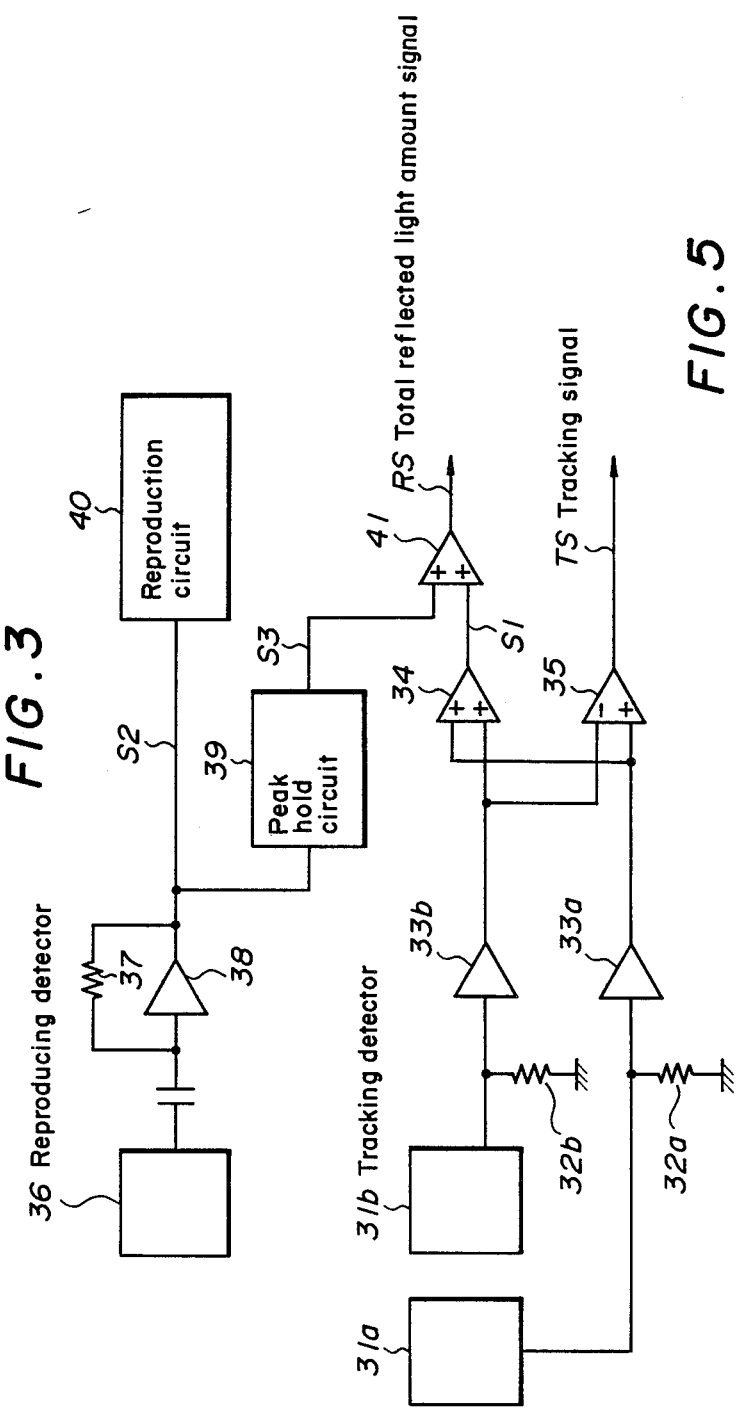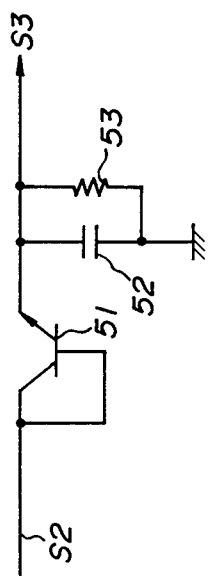

DETECTING LIGHT SPOT MOVEMENT DIRECTION FOR AN OPTICAL DISK

BACKGROUND OF THE INVENTION

The present invention relates to an access circuit of an optical disk unit, to prevent any access error caused by the reduction of reflected light from a light spot projected to an optical disk due to the influence of pits existing on the optical disk.

In the access circuit of the conventional optical disk unit, the moving direction of the light spot is detected to accurately position the light spot on an object track. Heretofore, a tracking signal and total reflected light amount signal have been used for this detection of the moving direction of the light spot.

The tracking signal is formed as follows. The reflected light of a light spot projected onto an optical disk is incident through a converging lens upon a pair of horizontally symmetrical photo sensors, and the difference between the output signals from the photo sensors in this pair is taken as the tracking signal. The tracking signal becomes zero when the light spot takes a position on a track or on a guide recess in the optical disk.

The total reflected light amount signal is formed as follows. The reflected light of the light spot projected onto the optical disk is incident through the converging lens upon the pair of horizontally symmetrical photo sensors, and the output signals from the photo sensors in this pair are added to each other. Thus, the total reflected light amount signal is generated. This total reflected light amount signal takes the maximum level when the light spot is in a position on a track, while it takes the minimum level when the light spot is on a guide recess in the optical disk.

FIG. 1(a) shows the status in which a light spot S is projected onto a surface 11 of an optical disk 10 and moving at a predetermined speed in the direction of arrow A. As shown, there are on the surface 11 of the optical disk 10 a plurality of regularly spaced guide recesses 13, and a track 14 in the center between the two successive guide recesses 13. The reference numerals 13a and 13b indicate the ends of the guide recesses 13.

FIG. 1(b) shows one example of a tracking signal TS' delivered when the light spot S moves at the predetermined speed as shown in FIG. 1(a). In FIG. 1(b), the vertical axis takes a voltage value while the horizontal axis takes a time. It should be noted here that the time interval t1 in FIG. 1(b) is equal to a time which the light spot S takes when it moves over a distance 1 (between the two successive guide recesses 13) shown in FIG. 1(a) at the determined speed. As apparent from FIGS. 1(a) and (b), the tracking signal TS' becomes zero when the light spot S takes a position on the track 14 and also when it is on the guide recess 13. The reason is as follows. That is, when the light spot S takes a position on the track 14, and also when it is on the guide recess 13, the amounts of reflected light incident upon the pair of photo sensors in pair are equal to each other.

FIG. 1(c) shows one example of a total reflected light amount signal RS' delivered when the light spot moves as shown in FIG. 1(a). In FIG. 1(c), the vertical axis indicates a voltage value while the horizontal axis takes a time. Note that the time interval t1 shown in FIG. 1(c) is equal to a time which the light spot S takes when it moves over a distance 1 (between the two successive guide recesses 13) shown in FIG. 1(a) at the predetermined speed. As seen from FIGS. 1(a) and (c), the total reflected light amount signal RS' takes the maximum level when the light spot S is on the track 14 while it takes the minimum level when the light spot S is on the guide recess 13. The reason is as follows. Namely, when the light spot S is on the track 14 (at the intermediate position between the guide recesses 13), the reflected light is less scattered so that the light reflection becomes the largest. On the contrary, when the light spot S takes a position on the guide recess 13, the reflected light is scattered by the guide recess 13 with the result that the reflection is minimized.

Referring now to FIGS. 2(a) thru (g), how the moving direction of the light spot is detected will be described. FIG. 2(a) shows one example of the tracking signal TS', and FIG. 2(b) shows one example of the total reflected light amount signal RS'. The signal 21 shown in FIG. 2(c) is a a signal derived from zero level-based binary-coding of the tracking signal TS' shown in FIG. 2(a). Also the signal 22 shown in FIG. 2(d) is a signal derived from binary-coding based on slice level SL of the total reflected light amount signal RS' shown in FIG. 2(b). It should be noted here that the trailing edge of the signal 22 shown in FIG. 2(d) is a signal indicative of the end 13a (see FIG. 1(a)) of the guide recess 13. To detect the moving direction of the light spot S, whether the signal 21 is H or L is determined at the trailing edge of the signal 22 that indicates the end 13a of the guide recess 13. Thereby, it is possible to determine whether the optical head (not sown) is positioned at the right or left side of the end 13a of the guide recess 13. The signal 23 shown in FIG. 2(e) is a pulse signal generated synchronously with the trailing edge of the signal 22 shown in FIG. 2(d). Therefore, by determining at the delivery of the pulse signal 23 whether the signal 21 is H or L, the moving direction of the light spot can be known. FIG. 2(f) shows the detection, as signal 24, of the light spot S moving from the left to right, and FIG. 2(g) shows the detection, as signal 25, of the light spot S moving from the right to left.

In an optical disk unit in which information is recorded by forming pits in the optical disk, the total reflected light amount signal TS' takes a waveform attenuated at the point where a pit P is formed in the track 14, as shown with dot line in FIG. 1(c). This is because the reflected amount of light from the optical disk is reduced as influenced by the pit P formed in the disk with the result that the amplitude of the total reflected light amount signal RS' is decreased.

As described in the above, if the amplitude of the total reflected light amount signal RS' is made small due to the existence of a pit, the trailing edge of the signal 22 shown in FIG. 2(d) cannot accurately indicate the end 13a of the guide recess 13 in the optical disk 14. As a result, the moving direction of the light spot S cannot be correctly detected. Note that the optical disk unit in which information recording is done by forming pits includes, for a write-once optical disk unit.

The previously-mentioned conventional techniques include, for example, the invention disclosed in the Japanese Unexamined Patent Publication (kokai) No. 58-91536.

SUMMARY OF THE INVENTION

The present invention has a primary object to provide an improved access circuit of an optical disk unit, in which it is possible to accurately detect the moving direction of a light spot moving on an optical disk.

The present invention has another object to provide an improved access circuit of an optical disk unit, in which the total reflected light amount signal formed based on the reflected light of a light spot is not influenced by the existence of multiple pits formed in an optical disk.

The present invention has still another object to provide an improved method of forming the total reflected light amount signal in the access circuit of an optical disk unit, by which the total reflected light amount signal formed based on the reflected light of a light spot is not influenced by the existence of multiple pits formed in an optical disk.

According to the present invention, the peak value of the optical disk read signal or the upper envelope of the read signal is detected, and the signal indicative of the detected peak value or envelope is used to correct the total reflected light amount signal., That is to say, the two output signals from the pair of horizontally symmetrical photo sensors which receive the reflected light of the light spot are consecutively added together, and a signal indicative of the result of this addition is consecutively added to the above-mentioned signal indicative of the peak value or envelope to form a total reflected light amount signal which is not influenced by the pits.

These and other objects and advantages of the present invention will be better understood from the ensuing description made, by way of example, of the preferred embodiment with reference to the drawings.

BRIEF DESCRIPTION OF THE DRAWINGS

FIGS. 2(a) thru (g) show waveforms, respectively, intended for explanation of how the moving direction of the light spot projected onto the optical disk is detected;

FIG. 3 is a block diagram showing one embodiment of the present invention;

FIG. 5 is a circuit diagram showing a concrete example of the peak hold circuit used in the embodiment shown in FIG. 3.

DETAILED DESCRIPTION OF THE PREFERRED EMBODIMENT

Figure 1A:
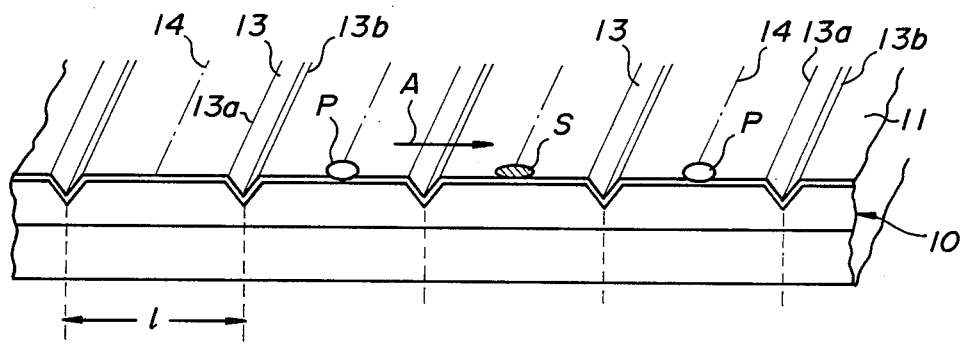
FIG. 1(a) is a schematic drawing of an optical disk.
Figure 1B:
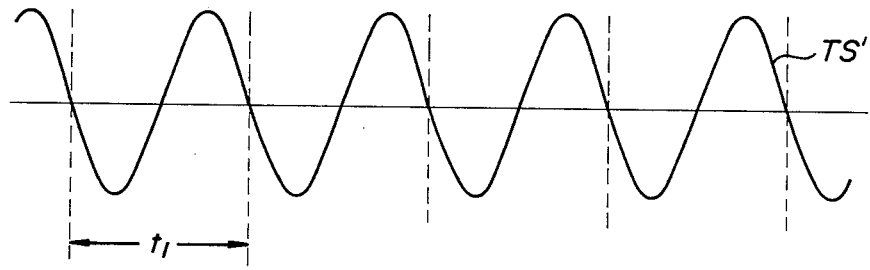
FIG. 1(b) shows a waveform of an example tracking signal.
Figure 1C:
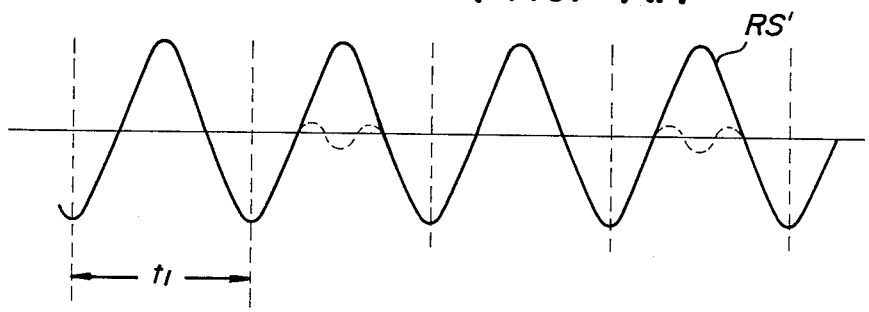
FIG. 1(c) shows a waveform of an example total reflected light amount signal.

FIG. 3 is a block diagram showing one embodiment of the present invention. In FIG. 3, a pair of tracking detectors 31a and 31b receive, through a converging lens (not shown), the reflected light of a spot line projected onto the optical disk and deliver current signals, corresponding to the amounts of the incident light upon them, respectively. The current signals are converted at resistors 32a and 32b into voltage signals, respectively, which will be supplied as input to amplifiers 33a and 33b, respectively. The outputs from amplifiers 33a and 33b are supplied to the adder 34 and subtractor 35 as shown in FIG. 3. The output signal S1 from the adder 34 is supplied to an adder 41. The subtractor 35 delivers a tracking signal TS.

On the other hand, there is provided a reproducing detector 36 which delivers a current signal corresponding to the existence or absence of pits formed on the optical disk. This current signal is converted into a voltage and amplified by means of a resistor 37 and amplifier 38, and delivered as read signal S2. This read signal S2 is supplied to a reproduction circuit 40, while it is supplied to a peak hold circuit 39 which will detect the peak value of the read signal S2 and deliver it as peak signal S3 to the adder 41. This adder 41 adds together the output signal S1 from the adder 34 and the peak signal S3 from the peak hold circuit 39 to deliver a total reflected light amount signal RS. This peak hold circuit 39 is required to have a good frequency response for detecting and holding the peak value of the read signal S2.

Figure 4A:
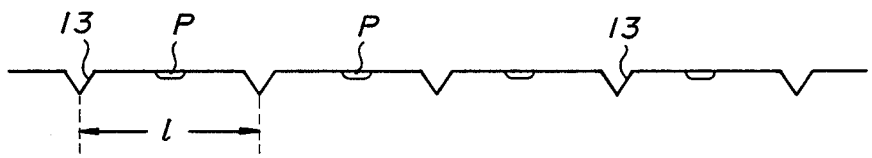
FIG. 4(a) is a schematic sectional view of the optical disk surface.
Figure 4B:
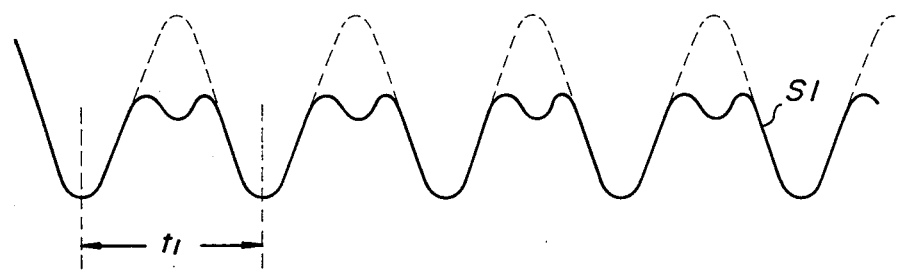
FIGS. 4(b) to (d) show waveforms explaining the operation of the embodiment shown in FIG. 3.
Figure 4C:
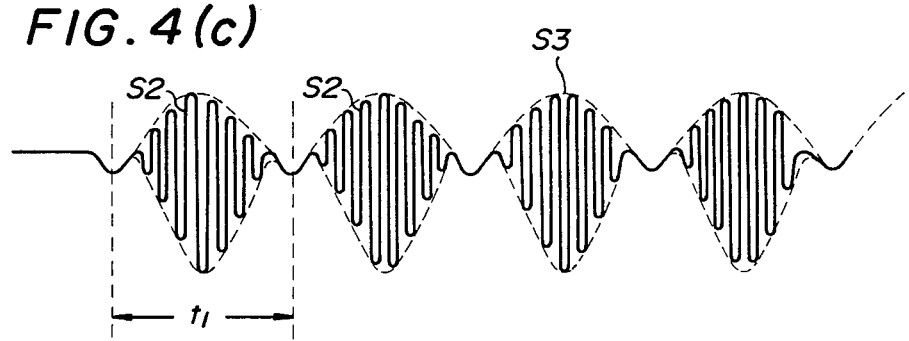
Figure 4D:
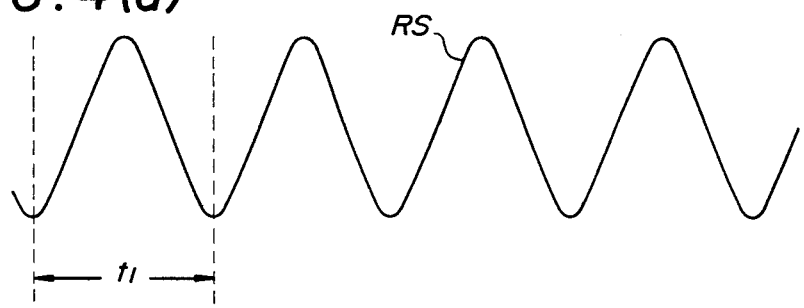

Next, the operation of the embodiment shown in FIG. 3 will be described in detail with reference to FIGS. 4(a) to (d). FIG. 4(a) is a schematic drawing of the optical disk surface. The reference numeral 13 indicates a guide recess, and P indicates a pit. FIG. 4(b) shows an example of the output signal S1 from the adder 34, which is produced when a light spot is projected onto the optical disk shown in FIG. 4(a). Note here that the time interval t1 shown in FIGS. 4(b) to (d) is equal to a time the spot light takes in moving over a distance 1 (between the two successive guide recesses 13) shown in FIG. 4(a) at a predetermined speed. As seen from FIGS. 4(a) and (b), the amplitude of the output signal S1 is reduced at the intermediate point between the guide recesses 13 due to the existence of the pit P. The wave form shown in FIG. 4(b) would correspond to the total reflected amount signal S1 of the system described above under the Background of the Invention. This signal S1 is not the total reflected amount signal of the present invention. Returning to the analysis previously set forth with respect to FIG. 2 involving the prior art, it can be seen that the prior art total reflected amount signal RS' was analyzed according to the slice level SL in FIG. 2(b) to produce the digital signal 22. If, according to the prior art, the slice level was applied to the signal S1, it is seen that the slice level could intersect a negative slope portion in the left hand portion of the signal S1 where the signal S1 is reduced at the intermediate point between the guide recesses 13 due to the existence of the pit P. Such an intersection, in the prior art, would produce a false trailing edge from an erroneous additional pulse in the signal 22 of FIG. 2(d), which false trailing edge would appear in time prior to the true trailing edge and may occur simultaneously with a high of the signal 21 when the true trailing edge appears simultaneously with a low of the signal 21 to produce an error; the error would be a pulse 24 when there should only be pulses 25, and the erroneous pulse 24 would indicate falsely a change in moving direction of the light spot. Conversely, a pulse 25 could erroneously be produced when there should be only pulses 24, which likewise would indicate an erroneous change in direction of movement of the light spot. FIG. 4(c) shows an example of the read signal S2 delivered from the amplifier 38 and an example of peak signal S3 delivered by the peak hold circuit 39 which has received the read signal S2. The peak hold circuit 39 shown in FIG. 3 detects the peak value of the read signal S2 and delivers the peak signal S3 as shown in FIG. 4(c). As apparent from FIG. 4(c), the peak hold circuit 39 delivers as the peak signal S3 the upper envelope of the read signal S2 delivered from the amplifier 38. FIG. 4(d) shows a total reflected light amount signal RS delivered from the adder 41 shown in FIG. 3. The total reflected light amount signal RS shown in FIG.

4(d) is a signal derived from addition of the output signal S1 from the adder 34 and the peak signal S3 from the peak hold circuit 39. As seen from FIG. 4(d), the amplitude of the total reflected light amount signal RS is not reduced at the intermediate point between the guide recesses 13. As a result, processing of the total reflected light amount signal RS of the present invention, for example according to the prior art wherein a slice level is used to produce a digital signal such as that shown in FIG. 2(d), there would be no false trailing edges that otherwise would occur with respect to such processing of the signal S1 of FIG. 4(b) where a slice level may produce false trailing edges in that portion of the signal S1 distorted by the presence of pits. Therefore, the moving direction of the light spot can be accurately determined without false reversal of direction being erroneously produced by pits in the optical disk.

It should be noted that in the embodiment shown in FIG. 3, by adjusting the amplification factor of the amplifier 38 and providing an appropriate amplifier and attenuator at the input or output side of the peak hold circuit 39, the output signal S1 from the adder 34 is properly corrected to form a total reflected light amount signal RS as shown in FIGS. 4 (b) to (d).

FIG. 5 shows an example of the peak hold circuit 39. As seen, the peak hold circuit includes of a transistor 51, capacitor 52 and resistor 53. In the peak hold circuit illustrated, when the amplitude of the read signal S2 is larger than the precedent amplitude, the transistor 51 turns on. Thus the amplitude of the read signal S2 is held as charge in the capacitor 52 and delivered as peak signal S3.

In the foregoing, an optical disk of a type in which the pit are formed at the intermediate portion on the optical disk between the guide recesses therein has been described. However, the present invention is not limited to this type of optical disk, but it can be applied to an optical disk of a type in which the pits are formed in the guide recesses.

According to the present invention, a stable total reflected light amount signal can be produced independently of whether or not the pits are formed on the optical disk. So, an access circuit can be provided which can accurately detect the direction in which the light spot is moving.

While a preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. An apparatus for generating and processing a total reflected light amount signal in an optical disk unit, comprising:
    a pair of detector means, each for detecting the reflected light from a light spot projected onto and moved relative to an optical disk containing information and respectively producing two electrical signals correlated to the amount of light reflected onto said pair of detector means;
    first adder means for summing said two electrical signals and producing a summation signal correlated to the sum of said two electrical signals;
    means for producing a read signal from the reflected light of the light spot so that said read signal is correlated to the formation contained on the optical disk;
    first means for processing said read signal and producing an electrical information signal correlated to the amplitude of said read signal;
    second adder means for adding said information signal and said summation signal and thereby producing a total reflected light amount signal correlated to the sum of said summation signal and said information signal; and
    second means for processing said total reflected light amount signal to thereby produce a signal indicating the direction of relative movement between the light spot and the optical disk.

2. The apparatus according to claim 1, wherein said first means for processing detects the peak value of said read signal; and said second adder means corrects the wave form of said summation signal for distortion caused by information pits in the optical disk.

3. The apparatus according to claim 2, wherein said first means for processing comprises a peak hold circuit including a transistor, a capacitor, a resistor, and means connecting said transistor so that it will conduct only for peak values of said summation signal to charge said capacitor and so that said resistor will bleed the capacitor charge for producing the information signal as a peak value voltage across said capacitor.

4. The apparatus according to claim 1, wherein said first means for processing detects the upper envelope of said read signal; and said second adder means corrects the wave form of said summation signal for distortion caused by information pits in the optical disk.

5. The apparatus according to claim 4, wherein said first means for processing comprises a peak hold circuit including a transistor, a capacitor, a resistor, and means connecting said transistor so that it will conduct only for the upper envelope of said summation signal to charge said capacitor and so that said resistor will bleed the capacitor charge for producing the information signal as a voltage across said capacitor.

6. A method of determining the moving direction of relative movement between an optical disk and an information reading light spot moving relative to the optical disk having information pits, comprising:
    projecting the light spot onto the optical disk containing the information to be read and relatively moving the light spot and optical disk;
    detecting, through a converging lens and a pair of photodetectors, reflected light of the light spot projected onto the optical disk and thereby producing two electrical signals correlated respectively to the reflected light detected by the pair of photodetectors;
    adding the two electric signals from the two photodetectors to produce an electrical summation signal;
    detecting the light reflected from the light spot contacting the optical disk and thereby producing a read signal correlated to the information contained on the optical disk;
    producing an amplitude signal correlated to the amplitude of the read signal;
    adding the amplitude signal and the summation signal together to produce a total reflected light amount signal correlated to the sum of the summation signal and the amplitude signal so that the total reflected light amount signal is corrected for scattering as caused by pits in the optical disk containing the information on the optical disk; and determining the direction of relative movement between the light spot and the optical disk by processing the total reflected light amount signal.

7. The method according to claim 6, wherein said step of producing the amplitude signal includes detecting the peak value of the read signal so that the amplitude signal is correlated to the peak value of the read signal.

8. The method according to claim 6, wherein said step of producing the amplitude signal includes detecting the upper envelope of the read signal so that the amplitude signal is correlated to the upper envelope of the read signal.

* * * * *